United States Patent Office 3,151,184
Patented Sept. 29, 1964

3,151,184
GRAFT COPOLYMERS OF POLYBUTADIENE AND A MONOARYL SUBSTITUTED VINYLIDENE COMPOUND AND PROCESS FOR PRODUCING SAME
Moyer M. Safford, Schenectady, and Robert L. Myers, Ballston Lake, N.Y., assignors to General Electric Company, a corporation of New York
No Drawing. Filed Mar. 27, 1956, Ser. No. 574,335
4 Claims. (Cl. 260—880)

This invention relates to graft copolymers of polybutadiene and a vinyl aryl compound. This invention also relates to a process of preparing graft copolymers of polybutadiene and a mono-aryl substituted vinylidene compound, for example, styrene, which comprises heating a mixture of (1) polybutadiene containing at least 30% 1,2-polybutadiene, (2) a mono-aryl substituted vinylidene compound, and (3) di-α-cumyl peroxide to a temperature at which a graft copolymer is formed. Furthermore, this invention relates to a process of curing this product which comprises heating said graft copolymer product to a temperature at which cross-links are formed. This invention also relates to said cured graft copolymers.

When two monomers (A and B) are copolymerized in the usual manner, they copolymerize in a random fashion so that a mixture of various copolymers of the type —A B A B A B—, A B A A B B A B A—, etc. are obtained. In the production of these random-type copolymers, the monomers making up the copolymer are usually present from the very beginning of the polymerization. If there is substantially no unpolymerized initial monomer present when a dissimilar monomer or monomers are added to the original polymer and reactive centers are present on the non-terminal part of the polymer chain, an entirely different kind of copolymer is produced. This copolymer having the following general formula:

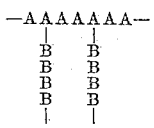

is called a graft copolymer since it is made up of one entire homopolymerized section of the original monomer and another homopolymerized section of the second monomer grafted thereto. These copolymers differ in molecular structure from the conventional random copolymers produced by merely reacting different monomers at the start of the polymerization reaction as described above and also differ from block polymers wherein large blocks of one homopolymerized monomer are joined along the main chain to another homopolymerized monomer to form the following type polymer:

Since polybutadiene has many reactive centers present on the non-terminal parts of the polymer chain due to the dangling vinyl groups, it is capable of forming graft copolymers with other unsaturated compounds.

The different structures present in a random copolymer, a block copolymer and a graft copolymer produce different properties even though the same proportions of monomers may be employed; for example, conventional random copolymers in most cases tend to lose the characteristic properties of the homopolymers of monomers making up the copolymer and assume quite different properties. On the other hand, either block or graft polymer, although differing from each other, tend to retain the characteristic properties of the homopolymer of the individual monomers. A block or graft copolymer of A and B would retain more of the characteristic properties of both polymeric A and B than would be present in a random copolymer produced from the same components. Thus, the graft copolymers of this invention are very different from random copolymers of butadiene and styrene which are known as GR–S.

Since cured polybutadiene is a fairly brittle material, it is desirable to modify it according to this invention so that the best characteristics of each homopolymer component is retained. Thus, the process of this invention can be used to produce "internally plasticized" polybutadiene, i.e., polymer wherein a more plastic polymer is joined to polybutadiene by primary chemical bonds. This can be effected by selecting a monomer which when polymerized forms a softer, more flexible polymer than polybutadiene, and adding this monomer to polybutadiene so as to form a strong but a more flexible polymer. These polymers are a considerable improvement over plasticized polybutadiene produced by conventional methods and are also superior to where the second monomer is randomly copolymerized throughout the polymer structure so that the resulting polymer possesses properties which are different from the properties of the homopolymers. The polymers of this invention are superior for herein the second monomer is added only in complete sections at certain parts of the polymer chain so that the desirable characteristic properties of the original polymer are less disturbed by the addition of the second component.

We have now discovered that graft copolymers of polybutadiene and other unsaturated compounds can be prepared by heating a mixture of (1) polybutadiene, (2) a mono-aryl substituted vinylidene compound, such as styrene, and (3) di-α-cumyl peroxide, to a temperature at which a graft copolymer is formed. This product may be used as a thermoplastic material or more be cured by heating to a temperature at which cross-links are formed. The significance of this discovery is that by employing di-α-cumyl peroxide, one can control the effect of the peroxide so the same peroxide acts as both polymerizing and curing agent. This peroxide is unique in that by decomposing slightly at a lower temperature it causes polymerization without totally destroying the peroxide which can later act as a curing agent at a higher temperature. Unexpectedly, these graft copolymers can be cured with di-α-cumyl peroxide within a short period of time, such as, for example, 15–30 minutes to produce, by a "short cure" method attractive to commercial production, a cured product having excellent properties. It could not have been predicted that such a graft copolymer would cure within this short period, since as disclosed in the prior art, polybutadiene could be cured by treatment with heat alone or heat and other peroxides only, over extended periods of time. Furthermore, the uncured peroxide-containing graft polymer can be worked at high temperatures, such as at 130–140° C. at which temperature it is often desirable to mill the material and at which temperature other peroxides commonly used prematurely decompose. In addition, because of the heat stability of the di-α-cumyl peroxide-containing grafts, copolymer can be shipped as a molding powder without deleterious effects.

This process is, in essence, a two-step process. In the first step, polybutadiene which is substantially free of monomeric butadiene is treated under polymerization conditions in the presence of 0.5% to 6% or higher of di-α-cumyl peroxide, preferably 2 to 4% based on total weight of polymer, in the presence of a mono-aryl substituted vinylidene compound capable of forming a graft copolymer with polybutadiene. The temperature of this polymerization is such that only a small amount of the peroxide is decomposed. In practice, the temperature of the polymerization is 60° C. to 150° C., preferably 90° C. to 110° C. Depending on the properties desired, the ratio of polybutadiene to the vinyl aryl compound can vary within wide limits, such as, for example, from about 0.1 to 99 percent of polybutadiene to total weight of the copolymer but preferably 5 to 50 percent. Of course, the time of the polymerization will vary with the particular vinyl aryl compound employed.

In the second step, the graft polymer produced in the first step is treated under cross-linking conditions. Cross-linking conditions generally are present when a substantial part of di-α-cumyl peroxide decomposes which occurs when the composition is heated at about 150° C. or above but below the decomposition temperature of the composition. Of course, at intermediate temperatures varying amounts of polymerization and cross-linking will take place almost simultaneously. Both polybutadiene and the unsaturated compound should advantageously be mutually soluble or soluble in a common solvent so that better reactive contact is achieved.

After the graft copolymer is produced in the first step, this composition can be fabricated, molded, extruded, calendered, etc. by suitable methods. The temperature at which the shaping operations are effected can be varied widely depending on whether it is desired that shaping and curing be accomplished in one operation. Curing can be effected at ordinary pressures or at super-atmospheric pressure, such as in a mold or press.

1,3-butadiene can enter into a polymer chain by either a 1,2- or 1,4-mode of addition; the 1,2-mode of addition results in the following "dangling vinyl" structure

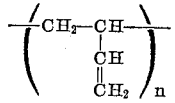

(hereafter called "1,2-polybutadiene") whereas the 1,4-mode of addition results in the following structure:

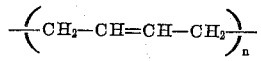

(hereafter called "1,4-polybutadiene"). Two types of catalysts are generally used to polymerize 1,3-butadiene, namely the free-radical and the alkali metal type catalyst. When 1,3-butadiene is polymerized by free-radical type catalysts, such as peroxide, persulfates, etc. in aqueous emulsions, a higher proportion of 1,4-polybutadiene results as compared to the product produced by the alkali metal type catalyst where a higher proportion of 1,2-polybutadiene is obtained. Using free-radical catalysts, one obtains polybutadiene having less than 25% 1,2-polybutadiene.

Although both free-radical polymerized butadiene and alkali metal polymerized butadiene can be used to prepare graft copolymers, the alkali metal polymerized butadiene is capable of forming a more highly grafted copolymer. This appears to be due to the fact that alkali metal polymerized butadiene which contains larger amounts of "dangling vinyl group" (1,2-polybutadiene) possesses more reactive centers than the free-radical cured butadiene which has its residual double bonds "buried" in the chain of the 1,4-polybutadiene and can be more effectively varied by the proper copolymer. Thus, in order to obtain polymers which are highly grafted, it is necessary to employ polybutadiene containing larger percentages of the 1,2-type, i.e. over 30% and preferably 50–100% of 1,2-polybutadiene.

Among the alkali metal type catalysts which have been used to produce polybutadiene having high percentages of 1,2-polybutadiene are alkali metals and compounds containing alkali metals. Thus, metals such as lithium, sodium, potassium, rubidium, cesium, sodium-potassium alloys, and compounds of these metals, such as phenyl isopropyl potassium, triphenyl methyl sodium, lithium butyl, amyl sodium and the like compounds have been used to effect such polymerization.

Whereas free-radical catalysts tend to produce larger amounts of 1,4-polybutadiene, catalysts of the alkali metal type tend to increase the ratio of the 1,2-polybutadiene. However, temperature as well as catalysts effect the type of polymer formed; for example, polybutadiene produced by polymerizing 1,3-butadiene with sodium at 110° C. contains about 15% of the 1,2-polybutadiene whereas 100% of 1,2-type polymer is produced when 1,3-butadiene is polymerized with sodium at −70° C. Although the ratio of the 1,2- to the 1,4-polybutadiene can be determined by ozonization, probably the more accurate method of determining this ratio is by the use of infrared spectra. Infrared curves identifying the different types of polymers are found in Dogadkin et al., "Rubber Chemistry and Technology," 24, pp. 591–596 (1951); Hampton, "Anal. Chem.," 21, pp. 923–926 (1949); and Meyer, "Ind. Eng. Chem." 41, pp. 1570–1577 (1949). An excellent description of polybutadiene polymers is found in Whitby, "Synthetic Rubber," pp. 734–757, Wiley and Sons, N.Y. (1954), wherein are described methods of preparing polybutadiene falling within the scope of this invention.

Since molecular weight is related to viscosity, viscosity measurements are a convenient method of expressing the molecular weight. Although polybutadiene gums of a broad intrinsic viscosity range can be employed, we advantageously have employed polybutadiene having an intrinsic viscosity of about 1.0 to 8.0 or higher. Optimum properties are obtained using polybutadiene having an intrinsic viscosity of 3.0 to 6.0.

Inherent viscosity is determined by a viscometer, such as an Ostwald viscometer on a 0.25 percent solution of polybutadiene in benzene. This value is calculated as the natural logarithm of the ratio of flow time of the solution to the flow time of the solvent divided by the concentration in grams/100 ml. Intrinsic viscosity [η] is obtained by extrapolating the inherent viscosity vs. concentration curve of zero concentration.

The term "mono-aryl substituted vinylidene compound" as employed herein and in the appended claims is intended to include and mean a compound wherein one aryl nucleus, such as benzene, naphthalene, anthracene, other more highly condensed systems, biphenyl, carbazole, etc., is attached directly to a vinylidene ($CH_2=C<$) group. These aryl nuclei can be unsubstituted or may contain other substituents on the aryl nucleus, such as alkyl, alkoxy, halo, cyano, carboxy, hydroxy, amino, etc. groups, the maximum number of which is determined by the number of replaceable aryl hydrogens. Included within the scope of vinylidene groups are also non-terminal substituted vinyl groups, such as

where R is alkyl (methyl, ethyl, propyl, etc.), for example, as isopropenyl,

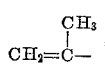

etc. Further examples of mono-aryl substituted vinylidene compounds are hereafter described. Di-α-cumyl peroxide,

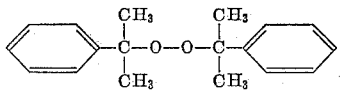

can be prepared by the method described in Karasch et al., "Journal of Organic Chemistry," 15, pp. 753–762 (1950).

In order that those skilled in the art may better understand how the present invention may be practiced, the following examples are given by way of illustration and not by way of limitation. All parts are by weight.

The thermoplastic flow measurements described in the examples were obtained in the following manner:

(1) A sample disk to be tested (approximately 0.225 inch thick) was accurately measured.

(2) Aluminum foil of .750 inch diameter was placed on each side of the sample disk.

(3) This was placed on a metal foot of the same diameter and heated in a circulating air oven in which the temperature could be accurately controlled.

(4) The sample was pre-heated to the desired temperature for five minutes.

(5) A load of 30 pounds per square inch was applied to the samples and readings were taken on a micrometer gauge connected to the sample through the oven at 15, 30, 45, 60, 120, 180, 240, 300, and 360 seconds.

(6) The sample was removed after 6 minutes.

(7) The calculations were made as follows:

$$\frac{O.R. - T.R.}{O.T.} \times 100\% = \text{Thermoplastic Flow}$$

O.T.—Original thickness (at room temperature)
O.R.—Thickness reading at 0 second after pressure applied (at tested temperature)
T.R.—Thickness reading after a specified time interval (at tested temperature)

EXAMPLE 1

A rubbery polymer was prepared from 1,3-butadiene and finely divided sodium using the technique described in Marvel et al., "J. Polymer Science, I," p. 275 (1946). The following procedure was employed: "Into clean, dry bottles was placed 0.1 g. of finely divided sodium dispersed in toluene. Thereafter, 25 g. of 1,3-butadiene was charged as a liquid. A small amount of the butadiene was allowed to evaporate to displace any air remaining in the bottle. The bottles were capped and rotated at 30° C. for a period of 48 hours. The residual catalyst was deactivated by adding 15 ml. of a 10% solution of absolute alcohol in benzene. The rubber was recovered by precipitation from a benzene solution by addition of ethyl alcohol until polymer no longer precipitated. To this precipitated product was added 0.1% of phenyl-β-naphthylamine as an antioxidant." This unwashed polymer had an intrinsic viscosity of 6.0 when measured in benzene solution. By infrared analysis, this product contained at least 60% of 1,2-polybutadiene.

Styrene is chosen as exemplary of a mono-aryl substituted vinylidene compound capable of forming a graft copolymer with polybutadiene. A series of graft copolymers were prepared by reacting varying amounts of the polybutadiene (prepared in Example 1) with varying amounts of styrene. The styrene used in the examples was re-agent grade styrene which had been washed with dilute aqueous sodium hydroxide, dried, and distilled. After polybutadiene had been dissolved in monomeric styrene, 3 percent of di-α-cumyl peroxide, based on total weight of the solution, was added. These solutions were then placed in a steam bath at 100° C. for about three hours and then for two additional hours in a 150° C. oven. At the end of this period, solid, hard rods of polymers were produced. As a control, styrene itself (without any polybutadiene) was treated in a similar manner. The thermoplastic flow under a load of 30 pounds per square inch at 150° C. of polystyrene was compared to that of the copolymers. The results are tabulated in Table I.

*Table I*

| Example | Percent Styrene | Percent Polybutadiene | Percent Thermoplastic Flow at 150° C. at 30 p.s.i. |
|---|---|---|---|
| 2 | 100 | 0 | 100 |
| 3 | 99 | 1 | 27 |
| 4 | 95 | 5 | 16 |
| 5 | 90 | 10 | 11 |

The following example is presented to show that the graft copolymer produced by heating a mixture of polybutadiene, styrene, and di-α-cumyl peroxide for three hours can be used as a molding resin.

EXAMPLE 6

Five parts of polybutadiene were dissolved in 95 parts of styrene. Thereupon three parts of di-α-cumyl peroxide were added. This solution was then heated in a steam bath at 100° C. for about 15–20 hours. This product was allowed to solidify and ground into a powder. This powder was placed in a mold and cured for 30 minutes at 170° C. The cured product has a thermoplastic flow of 1.85%.

From the above examples it is evident that the thermoplastic flow of polystyrene is very markedly decreased by even small amounts of polybutadiene thus rendering the graft copolymer more suitable for high temperature application than polystyrene itself. It is very surprising that such small amounts of polybutadiene should so alter the thermoplastic flow.

In addition to styrene, other mono-aryl substituted vinylidene compounds may be used, such as, for example, ring substituted alkyl, cycloalkyl, benzyl, etc., styrenes such as described in Schildknecht, "Vinyl and Related Polymers" (John Wiley and Sons, New York, 1952), Table I, page 130, ring substituted alkoxystyrenes, such as described on p. 132, Table III, halostyrenes, such as disclosed on page 148, Table 8, and page 152, Table 10, cyano, carboxy-, hydroxy-, amino-styrenes, etc., such as disclosed on page 157, Table II of vinyl biphenyl, vinyl naphthalene and related aryl compounds, such as disclosed on page 163, Table 12, etc. All the above cited pages refer to the Schildknecht text disclosed above. These tables are incorporated by reference into this specification.

The products of this invention, particularly those which are totally hydrocarbon, have excellent electrical properties.

Since the products of this invention have greater hot strength than polymerized mono-aryl substituted vinylidene compositions, they can be used in applications where polymerized mono-aryl substituted vinylidene compositions themselves fail due to high temperature form instability. Thus, these products can be used as hot strength film or tapes, for electrical parts, for example, spark plug caps, for household utensils which are used at elevated temperatures, for molded industrial parts, such as gears, etc. which are subjected to high temperatures, for industrial laminates, for conduits and containers for hot liquids, etc. as well as for other uses which will appear to those skilled in the art.

Although the presence of fillers tends to diminish the electrical properties, their presence is not precluded for blacks and metallic particles can be incorporated in these blends for strong but flexible heating pads and tapes. For other applications where electrical properties are of secondary importance, it may be desirable to add other fillers, such as finely divided silica aerogels, xerogels, fumed silicas, such as aerosils, silicas rendered hydrophobic by surface treatments with alcohols in the manner of U.S. Patent 2,657,149, Iler, and trialkylsilanes in the manner of Bueche et al. application Serial No. 531,829, filed August 31, 1955, now abandoned and assigned to the same assignee as the present application. Calcium silicates, aluminas, various kinds of carbon black and other fillers can also be used. In addition, other modifying agents, such as dyes, pigments, stabilizers, plasticizers, antioxidants, etc. can also be added without departing from the scope of the invention.

What we claim as new and desire to secure by Letters Patent of the United States is:

1. The process of preparing a graft copolymer of polybutadiene which comprises heating, to a temperature of from 60°–150° C., a mixture of a polybutadiene gum prepared by the bulk polymerization of butadiene with an alkali metal, said gum containing at least 30% 1,2-polybutadiene and having an intrinsic viscosity of at least 1, (2) a monoaryl-substituted vinylidene compound, and (3) from 0.5 to 6% based on the weight of (1) and (2) of di-α-cumyl peroxide to graft polymerize the monoaryl-substituted vinylidene compound to the polybutadiene and thereafter curing the copolymer at a temperature of 150° C. up to the decomposition point of the copolymer.

2. The product of claim 1.

3. The process of claim 1 wherein the monoaryl-substituted vinylidene compound is styrene and the alkali metal is sodium.

4. The product of claim 3.

References Cited in the file of this patent

UNITED STATES PATENTS

| | | |
|---|---|---|
| 2,338,741 | Soday | Jan. 11, 1944 |
| 2,426,476 | Vaughn et al. | Aug. 26, 1947 |
| 2,623,032 | Banes et al. | Dec. 23, 1952 |
| 2,625,525 | Lynch | Jan. 13, 1953 |
| 2,691,683 | Lorand et al. | Oct. 12, 1954 |
| 2,754,282 | Stoops et al. | July 10, 1956 |
| 2,755,270 | Hayes | July 17, 1956 |
| 2,862,905 | Banes et al. | Dec. 2, 1958 |

FOREIGN PATENTS

| | | |
|---|---|---|
| 593,072 | Great Britain | Oct. 8, 1947 |
| 499,577 | Canada | Jan. 26, 1954 |

OTHER REFERENCES

"Chemical Materials for Industry," Technical Service Bulletin, Hercules Powder Company. "Dicumyl Peroxide"—Technical Data Sheet No. 21-1-54.

Braden et al., "Trans. Inst. Rubber Ind.," 31 (No. 6), December 1955.

Whitby, "Synthetic Rubber," pages 298–299, Wiley and Sons, New York, N.Y. (1954).